(12) United States Patent
Saporetti et al.

(10) Patent No.: US 6,219,434 B1
(45) Date of Patent: Apr. 17, 2001

(54) MAXICODE LOCATING METHOD

(75) Inventors: Claudio Saporetti; Stefano Amorosi, both of Bologna (IT)

(73) Assignee: Datalogic S.p.A. (IT)

( * ) Notice: Subject to any disclaimer, the term of this patent is extended or adjusted under 35 U.S.C. 154(b) by 0 days.

(21) Appl. No.: 09/192,269

(22) Filed: Nov. 16, 1998

(30) Foreign Application Priority Data

Nov. 17, 1997 (EP) .................................................. 97830608

(51) Int. Cl.[7] ....................................................... G06K 9/00
(52) U.S. Cl. ................................................................ 382/100
(58) Field of Search ................................... 382/287, 288, 382/291

(56) References Cited

U.S. PATENT DOCUMENTS

| | | | |
|---|---|---|---|
| 4,876,732 | * 10/1989 | Miyagawa et al. ................... | 382/288 |
| 5,515,447 | * 5/1996 | Zheng et al. .......................... | 382/100 |
| 5,637,849 | 6/1997 | Wang et al. .......................... | 235/454 |
| 5,655,030 | * 8/1997 | Suzuki .................................. | 382/152 |

FOREIGN PATENT DOCUMENTS

WO95/34043    12/1995 (WO) .............................. G06K/7/10

* cited by examiner

*Primary Examiner*—Andrew W. Johns
*Assistant Examiner*—Shervin Nakhjavan
(74) *Attorney, Agent, or Firm*—Hall, Priddy, Myers & Vande Sande (57) ABSTRACT

A method of locating an optical code of the maxicode type wherein a central target element comprises three concentric black rings separated by two white annular spaces and a white circular central space defining the center of the target element. The method includes the steps of: acquiring and binary-coding an image of the optical code; examining rows and columns of the binary-coded image, each row or column having black elements, each defined by at least one elementary representation unit of a first binary value, and white elements, each defined by at least one elementary representation unit of a second binary value; performing a sequence control step to locate, in each examined row or column of the image, at least one predetermined sequence of white and black elements; and performing an assigning step in which the rows or columns in the image containing a sequence of white and black elements corresponding to the predetermined sequence are recognized as intersecting the center of the target element.

20 Claims, 7 Drawing Sheets

MAXICODE LOCATING METHOD

BACKGROUND OF THE INVENTION

The present invention relates to a maxicode locating method.

Figure 1:
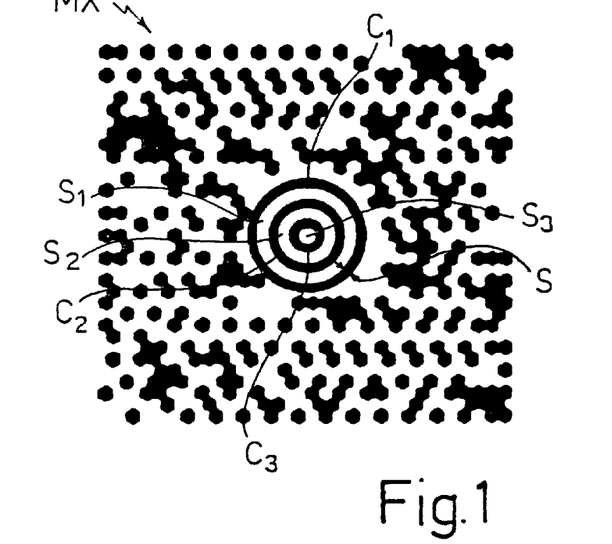
FIG. 1 shows a maxicode.

As is known, maxicodes (FIG. 1) are two-dimensional optical codes comprising a central target element (known as bull's-eye) by which to locate the code; and a number of dark/light (normally black/white) hexagonal-cell elements surrounding the central target element and containing the coded information associated with the code.

The central target element is defined by three concentric dark-coloured (normally black) rings of equal thickness separated by two light-coloured (normally white) annular spaces of the same thickness as the rings. The innermost ring surrounds a light-coloured (normally white) circular central space.

Known locating systems comprise an optoelectronic viewing system (normally comprising a focusing device and a television camera) for picking up a two-dimensional image (defined by a matrix comprising a number of pixels) of objects (in particular, moving objects, such as parcels traveling along a conveyor belt) to which maxicodes are applied and a processing device for locating the central space of the target element in the image and so locating the maxicode. The position of the central space of the target element in fact corresponds to the center of the maxicode.

The shape of the target element in the acquired image is affected by various factors, including:

Dimension scaling. The "apparent" dimension (measured, for example, in pixels) of the target element depends on the distance between the vision system and the maxicode. Since, in real applications, it must be possible for the maxicode to be located within a wide viewing range, the apparent dimension of the target element may vary within a fairly wide range of values.

Code ovaling. The target element of a maxicode is circular, but may be deformed, in particular, compressed along an axis into an ellipse (FIG. 2), so that the target element differs considerably from the original circular shape and may assume any one of numerous variously compressed oval shapes.

Ovaling of the target element is caused by two main factors, which may occur simultaneously:

The plane of the viewing system lens is not parallel to the plane containing the maxicode (as in the case of a parcel which is not a parallelepipedon);

the traveling speed of the object is not synchronized correctly with the scanning speed of the vision system.

To eliminate the above drawbacks, the vision system is normally subjected to restrictions, which must be established highly accurately and/or maintained within a strictly predetermined range. Such restrictions may include:

the distance between the vision system lens and the maxicode is required, for the image to be re-scaled before searching for the target element;

the traveling speed of the maxicode is required, to calibrate the image scanning speed;

inclination of the objects with respect to the vision system.

Moreover, to permit scaling, known locating devices require a maxicode of predetermined size (1 square inch).

SUMMARY OF THE INVENTION

It is an object of the present invention to provide a maxicode locating method for recognizing target elements with apparent dimensions and degrees of ovaling varying within a wide range of values and which involves no restrictions as regards the vision system.

It is a further object of the present invention to provide a method capable of also locating damaged target elements, e.g. target elements with missing ring portions.

According to the present invention, there is provided a method of locating an optical code of the maxicode type comprising a number of geometrically defined elements associated with coded information and a central target element defined by a number of concentric rings separated by annular spaces of a different colour from the rings; the innermost ring surrounding a circular central space defining the center of the target element; the method comprising the steps of: acquiring an image containing an image of said optical code; and binary-coding the acquired image to generate a binary-coded image defined by elementary representation units having a first binary value or a second binary value; the rings and spaces being represented by elementary representation units having first and second binary values respectively; characterized by comprising the steps of: examining oriented portions of said binary-coded image, each portion comprising a sequence of white and black elements, each black element being defined by at least one elementary representation unit having said first binary value, and each white element being defined by at least one elementary representation unit having said second binary value; performing a sequence control step to locate, in each examined portion of the image, at least one predetermined sequence of white and black elements; performing an assigning step in which the portions of said image containing a sequence of white and black elements corresponding to said predetermined sequence are recognized as portions intersecting the center of said target element.

More specifically, there is provided a pattern control step to determine whether the dimensions, in particular the widths, of the white and black elements in the examined sequence are relatable to a predetermined given sequence of a whole target element. Provision is also made for a further sequence control step, which is performed in the event of a negative outcome of said sequence control step; said further sequence control step comprising the step of locating, in each examined portion, at least one further predetermined sequence of white and black elements relating to a central portion of a modified, in particular damaged, target element.

BRIEF DESCRIPTION OF THE DRAWINGS

A non-limiting embodiment of the present invention will be described by way of example with reference to the accompanying drawings, in which:

FIG. 4b shows a detail of a second block in FIG. 4a;

DETAILED DESCRIPTION OF THE INVENTION

Figure 3:
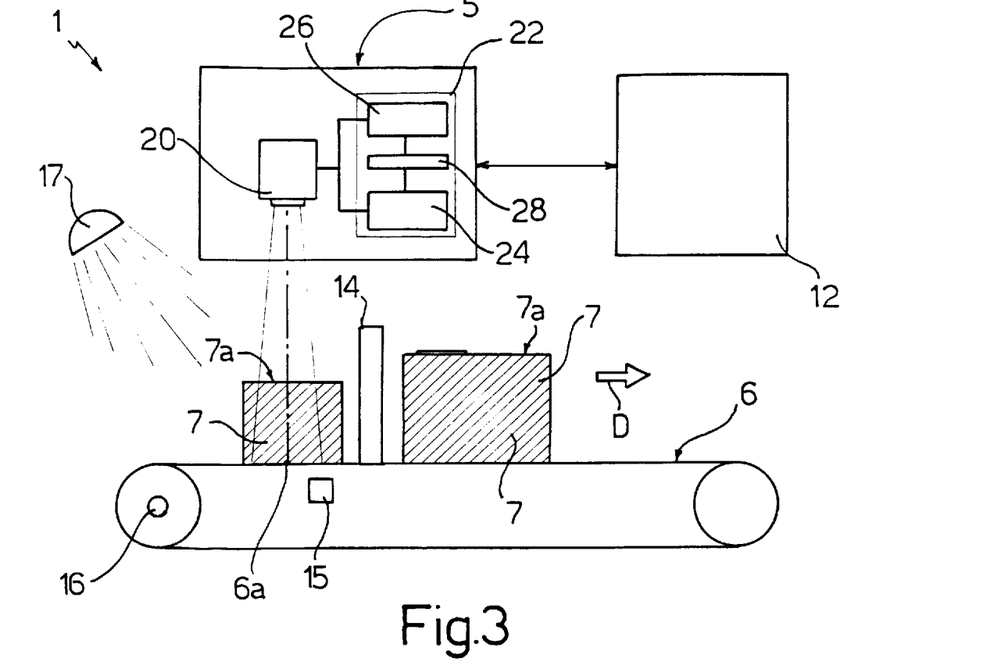
FIG. 3 shows an automatic optical code reading device implementing the method according to the present invention.

Number 1 in FIG. 3 indicates as a whole an automatic optical code reading device comprising a read head 5 facing a conveyor belt 6 to scan objects 7 laying on conveyor belt 6 and traveling in a straight horizontal direction D.

Each object 7 comprises, on a face 7 a facing read head 5, a scanning region containing a maxicode MX. As is known, a maxicode (FIG. 1) is a two-dimensional optical code comprising a flat central target element (known as bull's-eye) defined by three concentric dark-coloured (normally black) rings C1, C2, C3 (FIG. 5a) of equal thickness and separated by two light-coloured (normally white) annular spaces S1, S2 of the same thickness S. The innermost ring C3 surrounds a light-coloured (normally white) circular central space S3 of a radius substantially equal to S. A maxicode also comprises a number of hexagonal-cell elements (FIG. 1) surrounding the central target element, and which may be white or black.

Device 1 comprises an electronic control and processing unit 12 cooperating with read head 5.

The device also comprises a sensor 14 located along conveyor belt 6 to determine the height of objects 7 traveling along the belt; a sensor 15 to determine the presence of objects 7 close to read head 5 and a speed sensor 16 to determine the traveling speed of the belt (and therefore of the conveyed objects) with respect to read head 5.

Device 1 also comprises a lighting device 17 for lighting the section of the belt detected by read head 5.

With reference to FIG. 3, read head 5 comprises a television camera (e.g. a CCD camera) 20 for scanning a region 6a of the belt (continuously or when enabled by sensors 14, 15, 16) and a circuit 22 for processing the output signals of camera 20. Circuit 22 comprises a filter 24 input-connected to the output of camera 20; a memory 26 input-connected to the output of camera 20 for storing images and a programmable data processing unit (DSP-digital signal processor) 28 cooperating with filter 24 and memory 26.

Figure 4:
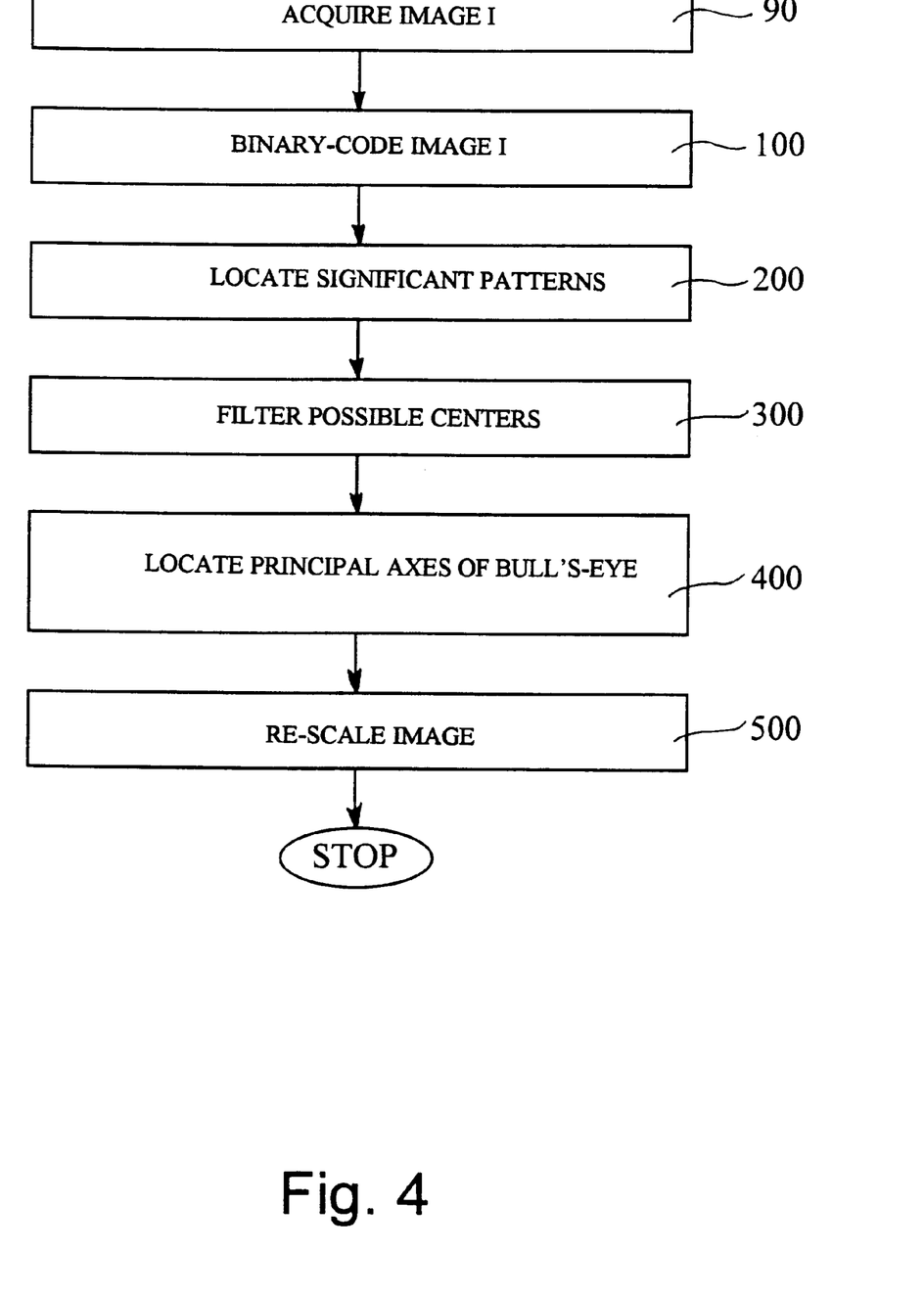
FIG. 4 shows a main block diagram of the method according to the present invention.

FIG. 4 shows a block diagram of the operating cycle of processing circuit 22.

To begin with, a block 90 acquires the image I picked up by camera 20. The image is defined by a number of pixels, each defined by an integer number (e.g. from 0 to 255) expressing the grey level of the pixel.

Block 90 is followed by a block 100, which binary-codes the image generated by camera 20. That is, in the embodiment shown, each pixel in image I of a grey level above a given threshold value is assigned a first binary logic value (e.g. a logic "1") and each pixel in the image of a grey level below the threshold is assigned a second binary logic value (e.g. a logic "0"). Other binary-coding methods may of course be used. The pixels in the maxicode image corresponding to dark rings C1, C2, C3 are therefore assigned first binary logic values "1" and the pixels corresponding to light spaces S1, S2, S3 are assigned second binary logic values "0". The image portions corresponding to white and black hexagonal-cell elements are replaced by pixels with second and first binary logic values respectively. The operations performed in block 100 (binary-coding of the image) are known and therefore not described in detail. The binary-coded image Ib may be represented by a square matrix defined by a number of pixels aligned in rows and columns and each having a respective binary value.

Block 100 is followed by a block 200 (detailed later on) which searches the binary-coded image Ib for significant patterns corresponding to maxicode central target elements. More specifically, block 200 determines the coordinates of target element centers, i.e. the coordinates of circular central space S3.

Block 200 is followed by a block 300 (detailed later on) which filters the possible centers, i.e. examines the coordinates of the centers determined in block 200 and eliminates any coordinates considered unacceptable. The center coordinates considered acceptable are memorized.

Block 300 is followed by a block 400 (detailed later on) which determines the principal axes of the geometric figure (circle or ellipse) externally defining the image of the central target element.

Block 400 is followed by a block 500 which, on the basis of the axis information determined in block 400, re-scales the image to compensate for any image distortion resulting in circle-to-ellipse conversion of the geometric figure of the central target element.

Figure 4A:
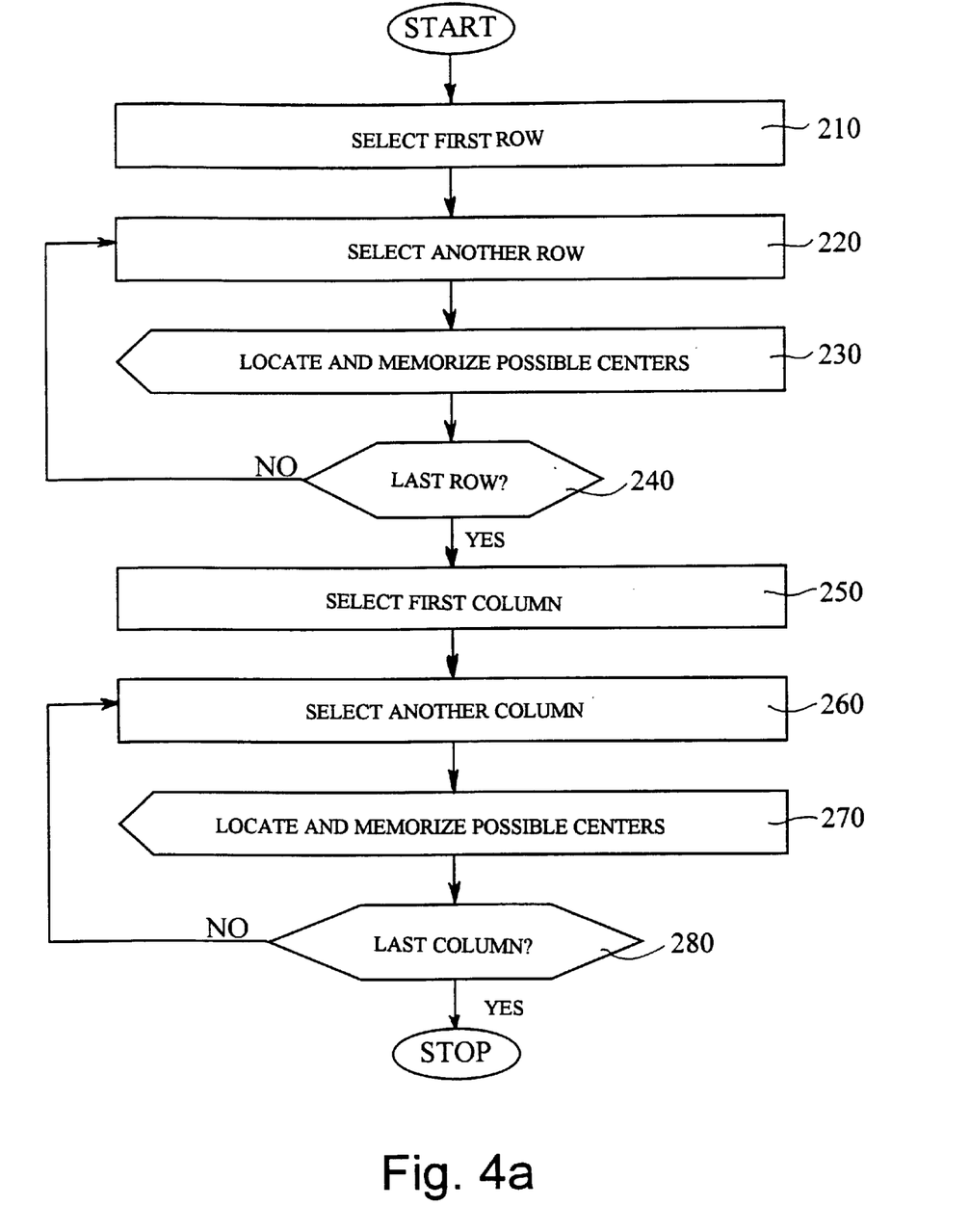
FIG. 4a shows a detail of a first block in FIG. 4.

FIG. 4a shows a detail of block 200 for determining the coordinates of the maxicode central target elements in binary-coded image Ib. As opposed to being performed on the whole image Ib (comprising images of the maxicodes, the objects to which the maxicodes are applied, and the background), the operations in block 200 may preferably, but not necessarily, be performed on subimages comprising an image of the maxicode and a portion of the object surrounding the maxicode. Such subimages are extracted by a known algorithm implemented by an optional block (not shown) interposed between blocks 100 and 200.

Block 200 comprises a first block 210 for selecting a first row in image Ib, e.g. a row at one edge of image Ib. Block 210 is followed by a block 220 for selecting another row, and which, if enabled for the first time, selects the row defined in block 210. Block 220 is followed by a block 230 (detailed later on with reference to FIG. 4b) for determining, in the selected row, the x,y Cartesian coordinates of the target element center.

Block 230 is followed by a block 240, which determines whether the currently selected row is the last row in image Ib. If it is not, block 240 goes back to block 220 to select a further row. Conversely (last selected row in image Ib), block 240 goes on to a block 250. The operations in blocks 210 to 240 provide for scanning image Ib row by row, i.e. for successively examining the rows in image Ib to extract from each row any x, y coordinates of the target element center.

Block 250 provides for selecting a first column in image Ib, e.g. a column at one edge of image Ib. Block 250 is followed by a block 260 for selecting another column, and which, if enabled for the first time, selects the column defined in block 250. Block 260 is followed by a block 270 (detailed later on with reference to FIG. 4b) for determining, in the selected column, the x,y Cartesian coordinates of the target element center.

Block 270 is followed by a block 280, which determines whether the currently selected column is the last column in image Ib. If it is not, block 280 goes back to block 260 to select a further column. Conversely (last selected column in image Ib), block 280 goes on to a block 300 (FIG. 4). The operations in blocks 250 to 280 provide for scanning image Ib column by column, i.e. for successively examining the columns in image Ib to extract from each column any x, y coordinates of the target element center.

Image Ib is therefore scanned successively in two perpendicular directions to determine the rows and columns in image Ib containing possible central target element coordinates, the located coordinates then being memorized.

Figure 4B:
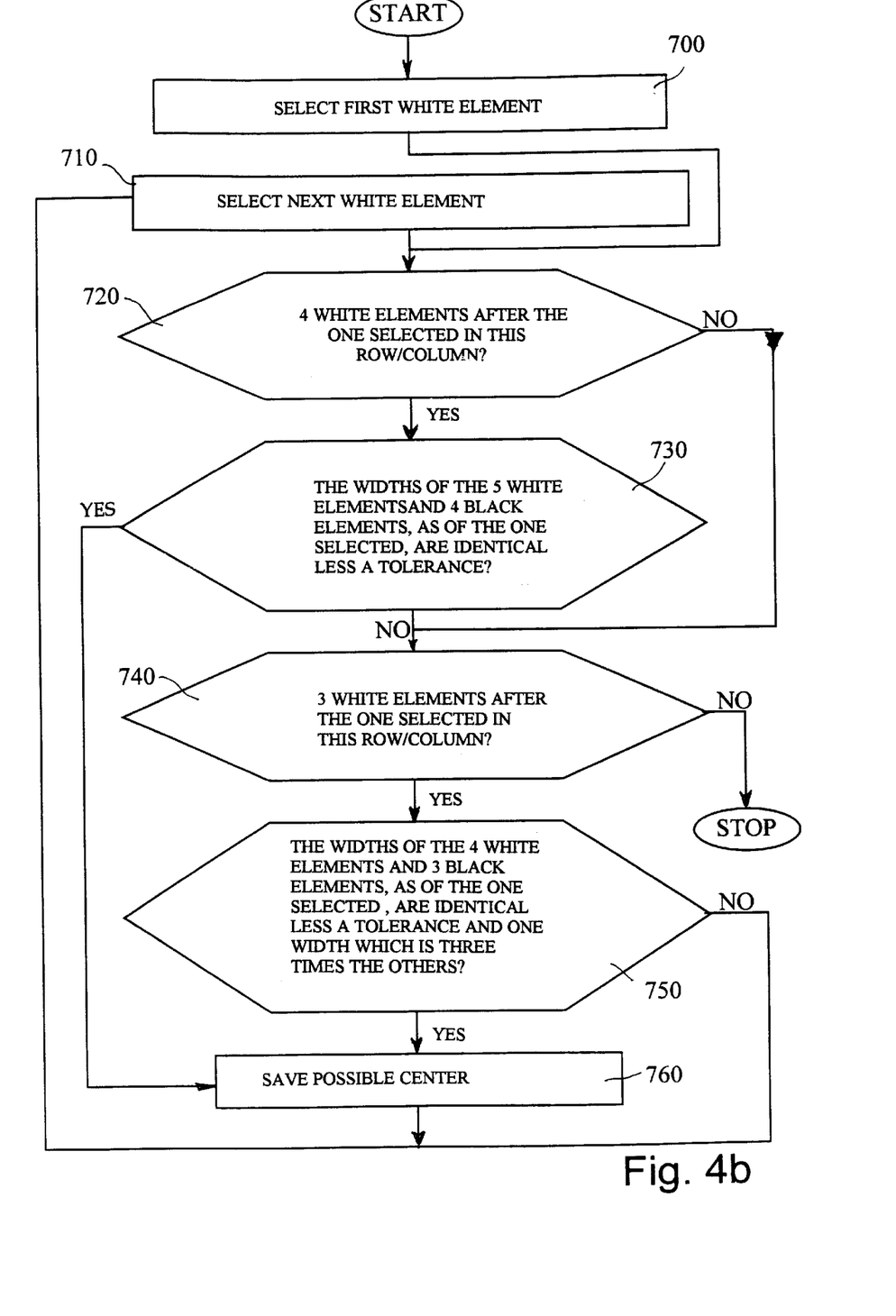

FIG. 4b shows a detail of blocks 230 and 270 for locating the target element center along a scanned row or column. Though reference is made in the following description to the location of a target element center along a row, the same also applies to the columns.

Block 230 comprises a first block 700, which considers a first white element in the image row selected in block 220, where white element is intended to mean one pixel of binary value "0" or a set of contiguous pixels, all of binary value "0" and aligned along the image row. In the following description, a black element is intended to mean one pixel of binary value "1" or a set of contiguous pixels, all of binary value "1" and aligned along the image row.

Block 700 is followed by a block 720, which determines whether, in the selected row, the white element selected in block 700 is followed by a predetermined sequence of black and white elements. More specifically, block 720 determines whether the white element selected in block 700 is followed by four white elements separated by four black elements. The sequence, including the selected white element W0, therefore comprises nine elements.

Figure 5A:
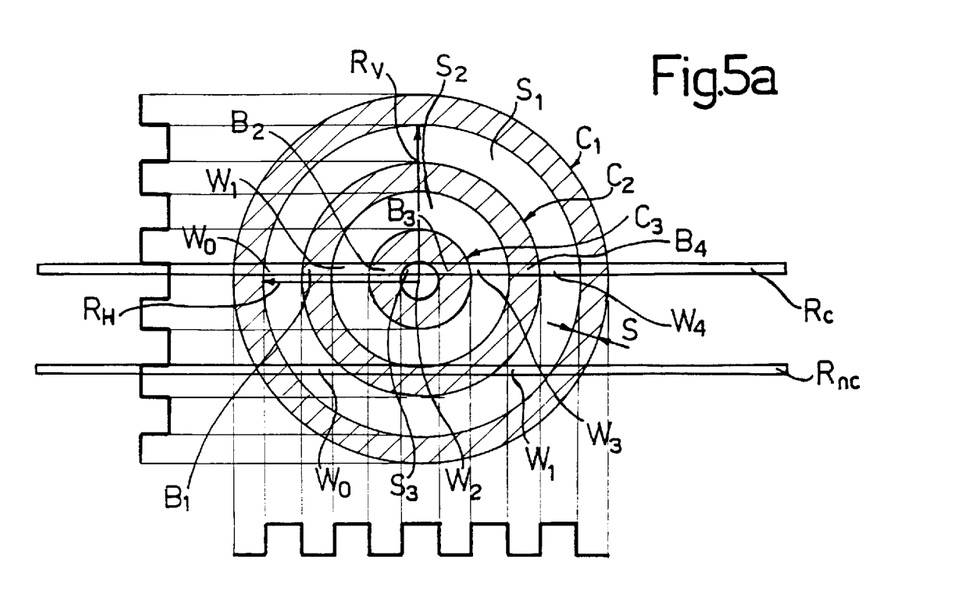
FIG. 5a shows an enlarged view of a central target element of a maxicode.

That is, for a row Rc (FIG. 5a) through the center of the target element, by defining as zero element W0 the white element between rings C1 and C2, zero element Wo is followed by four white elements, namely:

a first white element W1 between rings C2 and C3:

a second white element W2 surrounded by ring C3;

a third white element W3 between rings C3 and C2;

a fourth white element W4 between rings C2 and C1.

Zero element W0 is also followed by four black elements, namely:

a first black element B1 between white elements W0 and W1;

a second black element B2 between white elements W1 and W2;

a third black element B3 between white elements W2 and W3;

a fourth black element B4 between white elements W3 and W4.

Any row not intersecting the center of the target element has a different sequence of white and black elements from the one described above. For example, for row Rnc not intersecting the center and tangent to ring C2, by defining as zero element W0 the white element between rings C1 and C2, zero element W0 is followed by only one white element, namely, a white element W1 between rings C2 and C1.

Clearly, therefore, if the outcome of the operation performed in block 720 is positive, it is highly probable that the selected row passes through the center of the target element. In which case, block 720 is followed by a block 730, which determines whether the widths (measured along the row) of the white and black elements in the predetermined sequence determined in block 720 have predetermined ratios. In other words, block 730 determines whether the widths of the white and black elements in the selected row are relatable to a predetermined given sequence relative to a whole target element. More specifically, block 730 determines whether the widths of the five white elements W0, W1, W2, W3, W4 and four alternating black elements B1, B2, B3, B4 are substantially equal less a given tolerance. If the outcome of the operation in block 730 is also positive, block 730 is followed by a block 760, which determines the x, y coordinates of the white element W2 in the sequence, which corresponds in position to the circular space of the image and said x, y coordinates are elected as the center of the code.

Figure 5B:
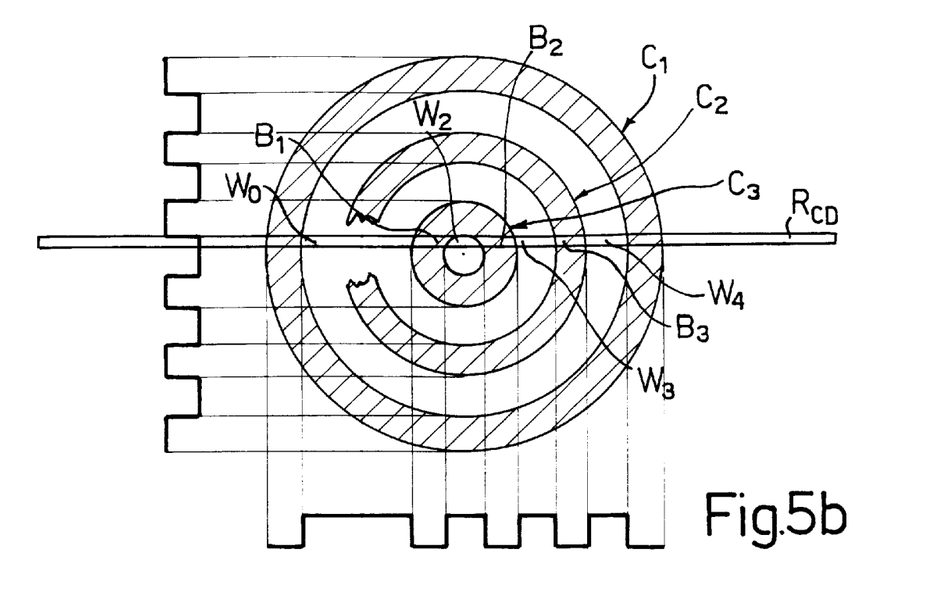
FIGS. 5b and 5c show enlarged views of central target elements of damaged maxicodes.

The coordinates of a possible center are thus memorized. Conversely, in the event of a negative response in block 730, this goes on to a block 740, which determines whether, in the selected row, the white element selected in block 700 is followed by a further (still acceptable) predetermined sequence of black and white elements. The further sequence differs from the one sought in block 720, by block 740 determining whether the white element selected in block 700 is followed by three white elements separated by three black elements, so that the further sequence comprises seven elements, including white element W0. In fact, for a row Rcd (FIG. 5b) intersecting the center of the target element and relative to a target element with a break in ring C2 (e.g. due to abrasion), by defining as zero element W0 the white element after ring C1, zero element W0 is followed by three white elements, namely:

a first white element W2 surrounded by ring C3;

a second white element W3 between rings C3 and C2:

a third white element W4 between rings C2 and C1; and white element W0 is three times as wide as white elements W2, W3, W4.

Zero element W0 is also followed by three black elements, namely:

a first black element B1 between white elements W0 and W2;

a second black element B2 between white elements W2 and W3;

a third black element B3 between white elements W3 and W4.

Detection of the above sequence indicates most likely a row through the center of a target element with a break in ring C2 or C3; in which case, the white element of triple width comprises white elements W1 and W2 joined by the missing portion of ring C2.

Figure 5C:
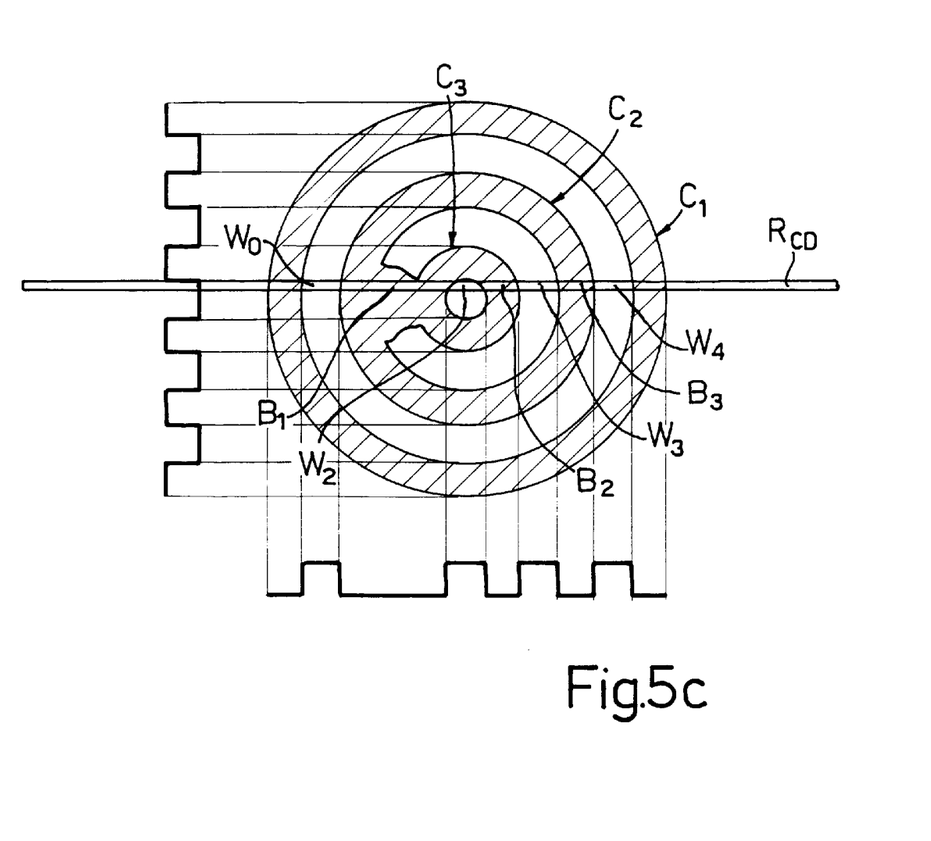

The same applies (FIG. 5c) to a row Rcd intersecting the center of the target element and relative to a target element in which rings C2 and C3 are joined by a black element (e.g. a stain). By defining as zero element W0 the white element after ring C1, zero element W0 is followed by three white elements, namely:

a first white element W2 surrounded by ring C3;

a second white element W3 between rings C3 and C2;

a third white element W4 between rings C2 and C1.

Zero element W0 is also followed by three black elements, namely:

a first black element B1 between white elements W0 and W2;

a second black element B2 between white elements W2 and W3;

a third black element B3 between white elements W3 and W4; and black element B1 is three times as wide as black elements B2 and B3.

In the event of a positive response, block 740 goes on to a block 750; conversely, block 740 goes on to block 240.

Block 750 determines whether the widths (measured along the row) of the white and black elements in the further predetermined sequence determined in block 740 have predetermined ratios. In other words, block 750 determines whether the widths of the white and black elements in the selected row are relatable to a predetermined given sequence relative to a damaged target element.

More specifically, block 750 determines whether the widths of the seven white and black elements (four white and three black—FIGS. 5b and 5c) are substantially equal between themselves, except for one element (white or black)

of three times the width of the others. In the event of a positive response in block 750 the center of a damaged target element is recognized and the coordinates of the target element center (of white element W2 ) are saved in the next block 760. Conversely, in the event of a negative response in block 750, this goes on to a block 710, which selects, in the selected row, the next white element to the one selected in block 700 and then goes on to block 720.

The operations shown in FIG. 4b therefore provide for sequentially examining the white elements in each selected row and for determining (block 720—first check) a predetermined sequence of white and black elements following each selected white element; which selected white element and the following predetermined sequence of white and black elements correspond to the sequence of white and black elements in a row through a whole target element. The ratios between the widths of the selected white element and the following white and black elements are also examined (block 730—second check) to determine a given sequence with predetermined ratios between the widths of the elements (white and black). If both the above checks are positive, the selected row is recognized as intersecting the center of the target element and the coordinates of white element W2 are memorized as a target element center.

Moreover, the white elements in each selected row are examined sequentially and a predetermined sequence of white and black elements following each selected white element is determined (block 740—third check); which selected white element and the following predetermined sequence of white and black elements correspond to the sequence of white and black elements in a row through a modified, in particular, damaged target element. The ratios between the widths of the selected white element and the following white and black elements are also examined (block 750—fourth check) to determine a given sequence with predetermined ratios between the widths of the elements (white and black). If both the third and fourth checks are positive, the selected row is again recognized as intersecting the center of a (damaged) target element and the coordinates of white element W2 are memorized as a target element center.

Figure 4C:
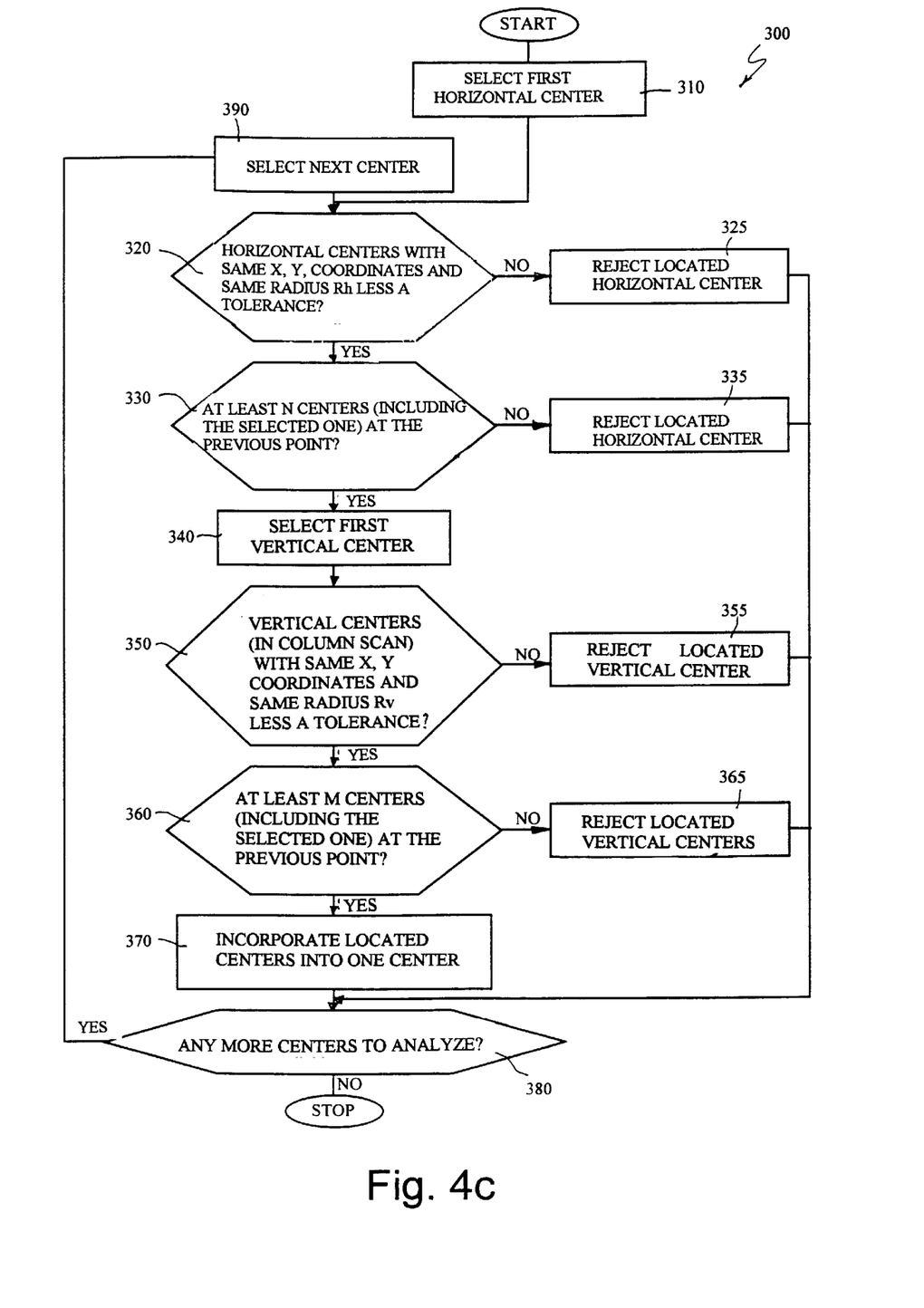
FIG. 4c shows a detail of a third block in FIG. 4.

FIG. 4c shows a detail of block 300 for examining the coordinates of the detected centers and eliminating any unacceptable coordinates.

Block 300 comprises a first block 310, which examines the x, y coordinates of a first center detected (block 760 ) in a row of image Ib examined by block 230.

Block 310 is followed by a block 320, which determines whether, in addition to the center selected in block 310, another row contains at least one further center with substantially the same x, y coordinates (less a tolerance factor) as the selected center. Block 320 also calculates the radius Rh of the target element associated with the center selected in block 310 and determines whether the other centers (if any) with the same x, y coordinates also have the same radius Rh (less a tolerance factor). Radius Rh may be calculated by adding the widths of the white and black elements from W0 to W4 and dividing the sum by two; the radius Rh so calculated relating to the circumference internally defining ring C1.

If the outcome in block 320 is negative, i.e. in the event of only one center with coordinates x, y or a number of centers with the same coordinates x, y but relative to target elements with different radii Rh, block 320 is followed by a block 325, which rejects the center selected in block 310. That is, the centers located in one row of image Ib or the centers located in more than one row but relating to target elements with different radii Rh are rejected.

If the outcome in block 320 is positive, i.e. in the event that more than one center with coordinates x, y and radius Rh exist, block 320 goes on to a block 330, which determines whether, in addition to the center selected in block 310, N centers (in N different rows) exist with substantially the same x, y coordinates and the same radius Rh as the selected center. If the outcome of block 330 is negative, block 330 goes on to a block 335, which rejects the center selected in block 310 and the further centers detected in block 330. That is, only the centers located in at least N rows of image Ib and relating to a target element with the same radius Rh are accepted and memorized.

Conversely, if the outcome in block 330 is positive, i.e. if at least N centers exist with x, y coordinates relative to target elements with substantially the same radius Rh, block 330 goes on to a block 340.

Block 340 examines the x, y coordinates of a first center detected in a column of image Ib examined by block 270.

Block 340 is followed by a block 350, which determines whether, in addition to the center selected in block 340, another column contains at least one further center with substantially the same x, y coordinates (less a tolerance factor) as the selected center. Block 350 also calculates the radius Rv of the target element associated with the center selected in block 340, and determines whether the other centers (if any) having x, y coordinates also have the same radius Rv (less a tolerance factor). Radius Rv may be calculated by adding the widths of the white and black elements from W0 to W4 and dividing the sum by two; the radius Rv so calculated relating to the circumference internally defining ring C1.

If the outcome in block 350 is negative, i.e. in the event of only one center with coordinates x, y or a number of centers with the same coordinates x, y but relative to target elements with different radii Rv, block 350 is followed by a block 355, which rejects the center selected in block 340. That is, the centers located in one column of image Ib or the centers located in more than one column but relating to target elements with different radii Rv are rejected.

If the outcome in block 350 is positive, i.e. in the event of more than one center with coordinates x, y and radius Rv, block 350 goes on to a block 360, which determines whether, in addition to the center selected in block 340, M centers (in different columns) exist with substantially the same x, y coordinates and the same radius Rv as the selected center. If the outcome of block 360 is negative, block 360 goes on to a block 365, which rejects the center selected in block 340 and the further centers detected in block 360. That is, only the centers located in at least M columns of image Ib and relating to a target element with the same radius Rv are accepted and memorized. An optional block (not shown) may also be provided for calculating the total number Ntc of horizontal and vertical centers saved (which total number therefore equals at least M+N), comparing the total number Ntc with a further threshold value, definitively memorizing the centers above the further threshold and cancelling the others.

If the outcome in block 360 is positive, i.e. if at least M centers exist with x, y coordinates relative to target elements with substantially the same radius Rv, block 360 goes on to a block 370.

Block 370 incorporates the centers determined in blocks 330 and 360 into one center, the coordinates of which are memorized.

For example, block 370 calculates the average of all the memorized centers, or randomly selects one out of all the acceptable centers.

Block 370 is followed by a block 380, which determines whether there are any more centers to be examined. If there are not, block 380 goes on to block 400. Conversely (centers still being examined), block 380 goes on to a block 390, which selects another center in another row and another center in another column, and is also followed by block 320. Blocks 325, 335, 355, 365 are also followed by block 380.

Block 400 provides for measuring deformation of the central target element image and subsequently reconstructing a re-scaled image (block 500) as close as possible to the real one.

As is known, the target element image is subject to linear deformation, i.e. rotation-translation of the image and/or scale changes in the reference system (reduction/enlargement and/or compression/expansion of the image).

Figure 2:
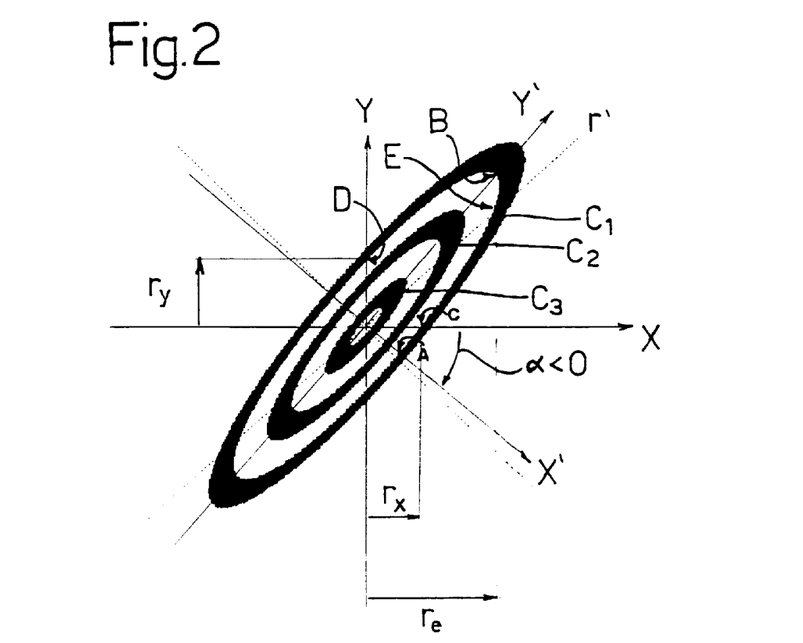
FIG. 2 shows an ovaled central target element of a maxicode.

FIG. 2 shows a deformed acquired image of a worst-case target element subjected to both forms of deformation.

To determine the linear transformation produced in the circular target element (in particular, in the inner perimeter of ring C1) to arrive at the ellipse in image Ib, it is necessary to calculate the two principal radii of the ellipse AO=a and BO=b and the angle $\alpha$ of inclination of the principal axes of the ellipse X' and Y' with respect to the reference axes X and Y (having the origin coincident with the center of the ellipse) with respect to which horizontal radius Rh=OC and vertical radius Rv=OD have been calculated, according to the equation:

$$\left(-\frac{\pi}{4} < \alpha \le \frac{\pi}{4}\right).$$

It should be stressed that points A, B, C, D lie on the boundary between ring C1 and space S1 (i.e. on the inner perimeter of ring C1) as opposed to the the outer perimeter of ring C1, which is not used as the outer perimeter of the deformed target element, owing to the target element possibly being surrounded by extensive black regions making the outer perimeter of ring C1 difficult to determine.

Any ellipse centered at the origin of axes X, Y may be represented by an equation of the type:

$$A*x^2+B*y^2+C*x*y=1 \qquad (1)$$

which represents a family of ellipses. To represent one ellipse in family (1), three points on the ellipse are required.

Block 400 calculates radii $r_x$=Rh=CO and $r_y$=Rv=DO, i.e. the points C and D at which the ellipse intersect respective axes X and Y, i.e. a first and second point of the ellipse. Rv and Rh are already known since ellipse has been scanned by rows and columns in block 200, but are nevertheless recalculated more accurately.

The ellipse is also scanned further along one of any line r' other than axes X and Y and intersecting the origin of the X, Y Cartesian system to locate a third point E on the ellipse. More specifically, the third point E is defined as the point at which line r' intersects the boundary between space S1 and ring C1. The scan along line r' (performed using algorithms similar to those in blocks 230 and 270) may also be used for further checking the selected center. If the sequence of white and black elements determined by the scan along line r' fails to conform (in sequence and pattern) with the sequence of a potential center, the selected center may be rejected. In addition to being performed in block 400 to calculate deformation, the further scan may also be performed in an optional block (not shown) between blocks 370 and 380.

For greater accuracy, a line r' far away from axes X and Y should be used and may advantageously be defined by the bisector of the first and third quadrant. Scanning line r' locates point of intersection E and radius re=EO.

If the ellipse defined in (1) passes through C, D and E, and line r' coincides with the bisector, the following are calculated easily:

$$A = \frac{1}{r_x^2}$$

$$B = \frac{1}{r_y^2}$$

$$C = \frac{2}{r_e^2} - \frac{1}{r_x^2} - \frac{1}{r_y^2}$$

Given A, B and C, a series of algebraic steps provides for calculating the principal radii a, b and angle $\alpha$:

$$\alpha = \frac{1}{2} * \mathrm{arctg}\left(\frac{C}{A-B}\right)$$

$$a = \sqrt{\frac{2*\cos(2*\alpha)}{\cos(2*\alpha)(B+A) - B + A}}$$

$$b = \sqrt{\frac{2*\cos(2*\alpha)}{2*\cos(2*\alpha)(B+A) + B - A}}$$

Ideally, therefore, radii a, b and angle $\alpha$ may be calculated fairly easily.

Radii a, b and angle $\alpha$ are supplied to block 500, which provides for "expanding" (i.e. proportionally enlarging) the image in the direction of the minor axis by a quantity proportional to the ratio between the major radius and minor radius of the ellipse (the lengths of which are known from the previous step) to restore the image to the circular shape of the target element. To restore the size of the resulting image to that of a reference image (typical of maxicode reading systems), the resulting image must also be scaled by a quantity proportional to the ratio between the radius of the resulting target element and the reference target element used by the decoding algorithms.

The advantages of the method according to the present invention are clear from the foregoing description. A maxicode locating method is provided, which is capable of operating with target elements of any apparent size and widely varying degrees of ovaling, by virtue of the code being located using, not the dimensions of the target element rings, but the ratios between these dimensions and therefore with no restrictions being imposed. The method described also provides for locating damaged target elements, e.g. with missing ring portions. The very small number of possible codes left and, in particular, knowledge of the exact dimensions of the code to locate permit subsequent successful application of known two-dimensional pattern-matching and reading algorithms.

What is claimed is:

1. A method of locating an optical code of the maxicode type comprising a number of geometrically defined elements associated with coded information and a central target element defined by a number of concentric rings separated by annular spaces of a different color from the rings; the innermost ring surrounding a circular central space defining the center of the target element;

the method comprising the steps of:
  acquiring an image of said optical code;
  binary-coding the acquired image to generate a binary-coded image defined by elementary representation units having a first binary value or a second binary value, the rings and spaces being represented by elementary representation units having first and second binary values respectively;

examining oriented portions of said binary-coded image; each portion comprising a sequence of white and black elements; each black element being defined by at least one elementary representation unit having said first binary value and each white element being defined by at least one elementary representation unit having said second binary value;

performing a sequence control step to locate, in an examined portion of the image, at least one predetermined sequence of white and black elements, said sequence control step including the step of measuring the width of each white element and each black element in the examined portion of the image;

performing a pattern control step by determining the ratios between the measured widths of the elements to detect patterns of elements having predetermined width ratios; and performing an assigning step in which the portions of said image containing white and black elements corresponding to said predetermined sequence and said patterns are recognized as portions intersecting the center of said target element.

2. A method as claimed in claim 1, wherein said pattern control step includes the step of determining whether the widths of the white an black elements in the examined sequence are relatable to a predetermined given sequence of whole target elements.

3. A method as claimed in claim 2, wherein said central target element is defined by three concentric rings separated by two annular spaces of a different colour from the three rings;

characterized in that said sequence control step comprises the steps of:
    selecting a first white element in said portion of said image;
    determining whether the selected white element is followed by four white elements separated by four black elements.

4. A method as claimed in claim 3, characterized in that said pattern control step comprises the step of determining whether the widths of the selected white element, of the following four white elements and of the following four black elements are substantially equal between themselves less a given tolerance.

5. A method as claimed in claim 1, wherein said pattern control step includes the step of determining whether the widths of the white an black elements in the examined sequence are relatable to a predetermined given sequence of modified, in particular damaged, target elements.

6. A method as claimed in claim 1 or 2, further comprising a further sequence control step which is performed in the event of a negative outcome of said sequence control step or in the event of a negative outcome of said pattern control step.

7. A method as claimed in claim 6, further comprising a further pattern control step which is performed in the event of a positive outcome of said further sequence control step.

8. A method as claimed in claim 7, wherein said central target element is defined by three concentric rings separated by two annular spaces of a different colour from the three rings;

characterized in that said further sequence control step comprises the steps of:
    selecting a first white element in said portion;
    determining whether the selected white element is followed by three white elements separated by three black elements.

9. A method as claimed in claim 8, characterized in that said further pattern control step comprises the step of determining whether the widths of three white elements and of the three black elements are substantially equal between themselves less a given tolerance and whether the width of one white or black element is approximately three times the widths of the other elements.

10. A method as claimed in claim 1, wherein said binary-coded image is definable by a matrix structure; characterized in that said oriented portion of said image comprises a row of the image; said sequence control step comprising the steps of successively checking the rows in said image to locate, in each selected row, said predetermined sequence.

11. A method as claimed in claim 10, characterized in that said portion of said image comprises a column of the image; said sequence control step comprising the steps of successively checking the columns in said image to locate, in each selected column, said predetermined sequence.

12. A method as claimed in claim 1, characterized in that said assigning step comprises the steps of determining the coordinates of the white element, in the examined sequence, corresponding to the circular central space in said image; and electing said coordinates as a center of the target element.

13. A method as claimed in claim 12, characterized by comprising a filtering step to filter the detected centers and eliminate any unacceptable coordinates.

14. A method as claimed in claim 13, characterized in that said filtering step comprises:
    a selecting step to select the coordinates of a detected center in a first portion of the image;
    a first examination step to determine whether, in addition to the selected center, there exists at least one further center located in another portion of the image and having substantially the same coordinates as the selected center;
    a rejection step to reject the selected center in the event said first examination step determines said selected center is the only center with said coordinates.

15. A method as claimed in claim 14, characterized in that said filtering step also comprises:
    a second examination step, which is performed in the event said first examination step detects at least one further center with substantially the same coordinates as said selected center;
    said second examination step determining whether, in addition to the selected center, there exists a first predetermined number of further centers located in different portions of said image and having substantially the same coordinates as the selected center;
    a further rejection step to reject the selected center and the centers detected in said second examination step, in the event said further centers are fewer in number than said first predetermined number.

16. A method as claimed in claim 15, characterized in that said first examination step and said second examination step are performed on coordinates of centers located in portions of the image having a first orientation with respect to the image;
    said filtering step also comprising a third examination step to examine coordinates of centers located in portions of the image having a second orientation crosswise, in particular perpendicular, to the first orientation;
    said third examination step determining whether, in addition to the selected center, there exists at least one further center with substantially the same coordinates as the selected center and located in another portion of the image having the second orientation;

said third examination step being followed by a second rejection step to reject the selected center in the event said third examination step determines said selected center is the only center with said coordinates.

17. A method as claimed in claim 16, characterized by comprising:

a fourth examination step, which is performed in the event said third examination step detects at least one further center with substantially the same coordinates as said selected center;

said fourth examination step determining whether, in addition to the selected center, there exists a second predetermined number of further centers located in different portions of said image and with substantially the same coordinates as the selected center;

a second further rejection step to reject the selected center and the centers detected in said fourth examination step in the event said further centers are fewer in number than said second predetermined number.

18. A method as claimed in claim 1, characterized by also comprising the steps of:

measuring deformation of the image of the central target element; and reconstructing a re-scaled image of said central target element on the basis of the measured deformation.

19. A method as claimed in claim 18, characterized in that said step of measuring said deformation comprises the steps of:

examining an elliptical perimeter within the geometric figure corresponding to the image of said target element;

determining two points at which the elliptical perimeter intersects respective axes of a Cartesian reference system having an origin coincident with the center of the elliptical perimeter;

performing an additional scan of the ellipse, corresponding to the image of the target element, along any line other than the axes of the Cartesian reference system and intersecting the origin of the Cartesian reference system to determine a third point on the elliptical perimeter;

calculating the radii of the ellipse defining the elliptical perimeter and the angle of inclination of the ellipse with respect to the Cartesian reference system, on the basis of data of the three points determined previously.

20. A method as claimed in claim 1, characterized by also comprising the steps of:

performing an auxiliary scan in an auxiliary direction other than the directions employed in said examination steps;

determining the sequence of white and black elements detected in the auxiliary scan;

checking whether the determined sequence conforms with the sequence of a possible center; and rejecting the center detected in said assigning step in the event the outcome of said checking step is negative.

* * * * *